United States Patent [19]

Hooykaas

[11] 4,317,684

[45] Mar. 2, 1982

[54] PROCESS OF CONVERTING POLLUTING PARTICLES, EMITTED IN CHEMICAL OR PHYSICAL PROCESSES, INTO HARMLESS SUBSTANCES

[75] Inventor: Carel W. J. Hooykaas, Rotterdam, Netherlands

[73] Assignee: Pelt & Hooykaas B.V., Netherlands

[21] Appl. No.: 93,512

[22] Filed: Nov. 13, 1979

[30] Foreign Application Priority Data

Nov. 22, 1978 [NL] Netherlands ......................... 7811498

[51] Int. Cl.$^3$ .......................... B28B 1/54; C04B 5/00; C08K 3/34; C09K 3/14
[52] U.S. Cl. ....................................... 106/316; 75/24; 106/36; 106/117
[58] Field of Search ......................... 106/117, 36, 316; 75/24

[56] References Cited

U.S. PATENT DOCUMENTS 3,684,539 8/1972 Bartholomew ..................... 106/117

FOREIGN PATENT DOCUMENTS

| | | |
|---|---|---|
| 643223 | 5/1964 | Belgium . |
| 1142888 | 1/1963 | Fed. Rep. of Germany . |
| 1339731 | 9/1963 | France . |
| 1378082 | 10/1964 | France . |

OTHER PUBLICATIONS

Chem. Abst. 84:8290z.

*Primary Examiner*—Allan Lieberman
*Attorney, Agent, or Firm*—Ostrolenk, Faber, Gerb & Soffen

[57] ABSTRACT

Harmful metals containing particles being emitted in chemical or physical processes, such as in iron production or in combustion processes, are caught and intimately divided in a molten metallurgic slag in order to avoid pollution problems.

12 Claims, No Drawings

PROCESS OF CONVERTING POLLUTING PARTICLES, EMITTED IN CHEMICAL OR PHYSICAL PROCESSES, INTO HARMLESS SUBSTANCES

BACKGROUND OF THE INVENTION

The present invention relates to a process of converting polluting particles emitted in chemical or physical procedures, and in particular to particles comprising environment-polluting metals, into harmless substances.

It is known per se that in several chemical or physical procedures particles escape comprising environment-polluting substances. Most of these polluting particles are caught and stored.

Chemical and physical processes relate in this case also to combustion of fuel, for instance in blast furnaces where the emitted particles are substantially light ash particles.

A disadvantageous result of storing environment-polluting particles, comprising finely powdered metals or metal compounds, is that the latter substances will be lixiviated and will consequently pollute the soil and/or ground water. In view of the ever increasing demands upon the quality of ground water and soil, a lixiviation of substances or other compounds from polluting particles into ground water is inadmissible, the more so when the stored polluting particles comprise finely powdered metals or metal compounds being environment-polluting, such as zinc, cadmium, copper and the like.

Efforts have been made to recycle said particles by chemical or physical procedures, but in most cases this has proved to be impossible. This applies particularly to dust emitted when processing iron-ore into ore-pellets in a blast furnace. Said emitted dust comprises large amounts of zinc, cadmium or copper. Efforts to recycle these metals in the blast furnace have been in vain since the quality of ore-pellets so produced is unsatisfactory. A recycling of the emitted dust in sintering plants where ore-pellets are sintered has proved to be impossible also, because zinc, for instance, accumulates.

Furthermore, efforts have been made to use the caught particles emitted in chemical or physical processes as fillers in fluid bituminous products, but this has the disadvantage that mixing them with bitumen is extremely difficult.

It is an object of the present invention to provide a process of converting polluting particles emitted in chemical or physical processes into harmless substances not presenting the abovementioned disadvantages, whereby, more particularly, the caught polluting particles will be converted into an entirely harmless form.

SUMMARY OF THE INVENTION

This object is attained according to the present invention in that the caught polluting particles are mixed with a molten silicate-containing material.

After the finely powdered substances have been caught, they are completely absorbed in the molten silicate-containing material from which they cannot possibly be lixiviated. This prevents any environmental pollution by harmful substances in such emitted particles, such as harmful metals or harmful metal compounds.

Advantageously, the caught particles are added to a molten metallurgic slag-material, more particularly a blast furnace slag.

This offers the advantage that caught particles comprising particularly polluting metals or metal compounds are made harmless by means of a very cheap material which is available in abundance.

Appropriately, the emitted finely powdered metals or metal compounds are caught in a dust catcher or a cyclone.

The process according to the invention is particularly suitable for a process of recovering iron from ore-pellets in blast furnaces whereby polluting particles are emitted which contain, for instance, zinc, cadmium and/or copper, which particles are mixed with a molten silicate-containing material, preferably a blast furnace slag, a steel furnace slag and/or a phosphor furnace slag.

At least 10% of molten silicate-containing material is appropriately mixed with the caught particles.

Preferably, 3 to 9, and more preferably 6 parts of molten silicate material are mixed with one part of caught polluting particles. In case of caught particles which do not melt in the molten silicate material, a higher ratio of silicate-containing material should be applied.

Appropriately 30 to 70% of molten silicate-containing material is mixed with 70 to 30% of caught polluting particles.

The molten silicate-containing material is mixed to a content and at a temperature such, that the caught polluting particles substantially melt entirely.

Preferably, equal parts of caught polluting particles and of molten silicate-containing material, more particularly in the form of a metallurgic slag-material, are mixed.

Conveniently, more than 25% of molten silicate-containing material, more particularly slag-material, is mixed with the caught polluting particles.

Molten metallurgic slag-material generally has a temperature of 1200° to 1500° C. during the mixing, which causes the polluting particles emitted in chemical processes and being subsequently caught, to be taken up into the slag-material in molten condition.

It is recommended to add anti-skid-promoting stabilizers, preferably grains of sand, to the melt obtained.

Thus a melt is obtained which, when broken, provides a material with high anti-skid properties being most suitable for use in road-building.

Instead of grains of sand, corundum particles or similar particles improving the anti-skid properties of material obtained by breaking, may be added.

Suitable materials for increasing the roughness are corundum particles or similar particles.

If desired, the broken material obtained may also be subjected to a anti-skid-promoting surface treatment.

SURVEY OF EXAMPLES

EXAMPLE I

Iron-ore pellets are prepared in a pelletizing plant according to a process known per se. The produced ore-pellets are subjected to a sintering process in a sintering furnace at a temperature of 1000° C.

The ore-pellets thus sintered to which coke is added as a reducing material are then supplied to a blast furnace.

At the bottom of the blast furnace, a furnace slag with a temperature of about 1400° C. is drawn off.

When ore-pellets obtained by pelletizing are added to the blast furnace, a considerable amount of dust, containing zinc, cadmium and/or copper and possibly other metals, is emitted.

Said dust is environmental-polluting to a great extent and must therefore, not be emitted furthermore, but be caught in a dust catcher or cyclone.

The particles comprising finely powdered metals or metal compounds emanating from the catcher or cyclone, are added to the fluid metallurgic slag-material, advantageously in a proportion of 25%.

Due to this process, the caught polluting particles comprising finely powdered metals or metal compounds will melt and be enclosed efficiently in the molten slag-material.

A lixiviation of said metals from the molten slag after congelation is impossible.

After hardening of the metallurgic slag-material comprising the polluting particles, this material is broken and mixed with asphalt.

So as to promote the anti-skid properties of the obtained material, anti-skid promoting substances, such as grains of sand, may be added to the molten slag comprising the finely powdered metal pollutions or metal compounds.

Appropriately corundum particles which promote anti-skid properties are also added to the mass as mentioned hereinbefore.

As a result of the presence of grains of sand, the material obtained possesses a high roughness, due to which it is very suitable for road-building.

A particularly good material is obtained by adding 10% of grains of sand to the mass.

By replacing sand by corundum particles, the roughness still increases.

By subjecting the material obtained by breaking to an etching treatment, the roughness may be increased, if necessary.

EXAMPLE II

A phosphate-containing ore is reduced with carbon in a chemical furnace. In this process, particles of dust, for instance zinc particles, are caught by, for instance, a Cotrell dust catcher. Said caught particles are received in the fluid phosphorus furnace slag escaping from the furnace.

Advantageously 25% of the caught particles as obtained are mixed with said phosphorus furnace-slag.

Thereafter this mass may be broken and used as a road construction material as described in example I.

What is claimed is:

1. A process of converting polluting metal or metal compound particles being emitted in chemical or physical processes into harmless substances, said polluting particles being caught and mixed with at least 10% of a molten silicate-containing slag.

2. A process according to claim 1, wherein the caught particles are mixed with a molten, metallurgic slag-material.

3. A process according to claim 1, wherein dust particles emitted during recovering iron from ore-pellets in a blast furnace, are caught and mixed with the molten silicate-containing slag.

4. A process according to claim 1, wherein the emitted particles comprise zinc, cadmium or copper.

5. A process according to claim 1, wherein the polluting particles are caught in a cyclone.

6. A process according to claim 3, wherein the ore-pellets are produced in a pelletizing plant.

7. A process according to claim 1, wherein the molten silicate-containing slag comprises a phosphorus furnace-slag, a blast furnace-slag or a steel furnace-slag said molten silicate-containing slag being applied in an amount and at a temperature such, that the caught polluting particles melt entirely.

8. A process according to claim 1, wherein 3 to 9 parts, of molten silicate-containing slag are mixed with one part of caught polluting particles.

9. A process according to claim 1, wherein 30 to 70% of molten silicate-containing slag is mixed with 70 to 30% of caught polluting particles.

10. A process according to claim 1, wherein anti-skid-promoting stabilizer is added to the melt obtained, and the melt as obtained is broken.

11. A process according to claim 1 wherein 6 parts of molten silicate-containing slag are mixed with one part of caught polluting particles.

12. A process according to claim 10, wherein the anti-skid-promoting stabilizer is at least one member of the group consisting of sand and corundum.

* * * * *